UNITED STATES PATENT OFFICE.

HENRI MAURICE TAQUET, OF ARGENTEUIL, FRANCE.

TREATMENT OF ZINC ORES.

SPECIFICATION forming part of Letters Patent No. 686,915, dated November 19, 1901.

Application filed March 29, 1901. Serial No. 53,509. (No specimens.)

*To all whom it may concern:*

Be it known that I, HENRI MAURICE TAQUET, a citizen of the Republic of France, and a resident of Argenteuil, Seine, Republic of France, have invented Improvements in the Treatment of Zinc Ores, of which the following is a specification.

This invention relates to the treatment of zinc ores, as well as industrial residues or solutions containing said metal.

The main object of the invention is to so treat mixed ores of zinc and lead as to economically extract the zinc from them and at the same time obtain sulfids of alkaline-earth metals.

In carrying out my invention I proceed in the manner which I will now describe, taking as an example the treatment of a mixed ore of zinc and lead—that is, an ore containing galena and blende. This ore is submitted to any of the well-known roasting processes for obtaining by lixiviation with water or with water containing sulfuric acid a solution of sulfate of zinc and an insoluble residue containing silicum, lead, and precious metals. The solution of sulfate of zinc, which may be purified or not, is incompletely decomposed by an alkaline-earth-metal chlorid—such as that of calcium, barium, or strontium—so as to obtain a precipitation of alkaline-earth-metal sulfate and a zinciferous solution containing, for example, one part of zinc sulfate to three parts of chlorid of zinc.

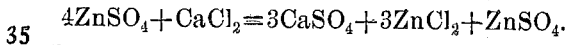

The precipitate of sulfate of calcium is separated out, and the solution, containing sulfate and chlorid of zinc, is treated with oxid of calcium, oxid of barium, or oxid of strontium. In this manner a precipitate is obtained which readily collects together and is easily separated by the aid of a filter-press—for example,

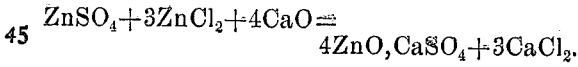

The proportions of the two salts sulfate and chlorid of zinc may be varied; but those stated have given good results.

The mixture of alkaline-earth-metal sulfate and oxid of zinc constitutes an artificial zinc ore containing about fifty per cent. of zinc. This artificial ore, mixed with an excess of carbon and treated in zinc-furnaces, produces simultaneously metallic zinc, which is distilled over, and a residue of alkaline-earth-metal sulfid. I thus obtain in one and the same operation metallic zinc and a residue (sulfid of calcium, sulfid of barium, or sulfid of strontium) which can be utilized in the industries for the manufactures of different products, such as hyposulfites, precipitated metallic sulfids, sulfur, &c.

The advantages which result from the above-described process are, first, economical treatment of mixed ores; second, extraction of zinc from these ores, and, third, production of alkaline-earth sulfids, which can be utilized in different ways in the industries.

I claim as my invention—

1. The herein-described process which consists in first subjecting a solution containing sulfate and chlorid of zinc to the action of oxid of an alkaline-earth metal and thereby obtaining by precipitation an artificial product composed of oxid of zinc and sulfate of the alkaline-earth metal and then subjecting this product mixed with carbon to heat and thereby obtaining at one and the same operation metallic zinc and a residue of alkaline-earth-metal sulfid, all substantially as described.

2. The herein-described process which consists in subjecting a mixture of oxid of zinc and sulfate of an alkaline-earth metal to heat in the presence of an excess of carbon and distilling over metallic zinc while leaving a residue of alkaline-earth-metal sulfid, substantially as described.

In testimony whereof I have signed my name to this specification in the presence of two subscribing witnesses.

HENRI MAURICE TAQUET.

Witnesses:
LÉON FRANCKEN,
EDWARD P. MACLEAN.